Oct. 1, 1929.  R. BERTHON  1,729,922
FILM FOR COLOR PHOTOGRAPHY
Filed June 17, 1927

INVENTOR
Rodolphe Berthon
BY
Emil Bönnelycke
ATTORNEY

Patented Oct. 1, 1929

1,729,922

UNITED STATES PATENT OFFICE

RODOLPHE BERTHON, OF NEUILLY, FRANCE, ASSIGNOR, BY MESNE ASSIGNMENTS, TO SOCIETE FRANCAISE CINECHROMATIQUE (PROCEDES R. BERTHON), OF PARIS, FRANCE, A CORPORATION OF FRANCE

FILM FOR COLOR PHOTOGRAPHY

Application filed June 17, 1927, Serial No. 199,558, and in France May 6, 1927.

Hitherto proposed films or plates provided with microscopic refracting elements are composed of, at a minimum, two layers or coatings, one of which, the one whereon the elements are formed, is entirely transparent and has a thickness corresponding to the focal distance of the refracting elements, while the other layer or coating, which may be opaque, consists of a gelatino-silver bromid emulsion.

When the light-sensitive substance used (bichromates, mixtures of azo and diazo-compounds, etc.) is perfectly transparent and is further characterized by the fact that, on being exposed under a positive, it produces a second positive, it becomes possible to form the film (or the plate), of a single layer the mass or body of which is impregnated with the sensitizing substance, and this is what constitutes the essential feature of the present invention.

Figure 1:
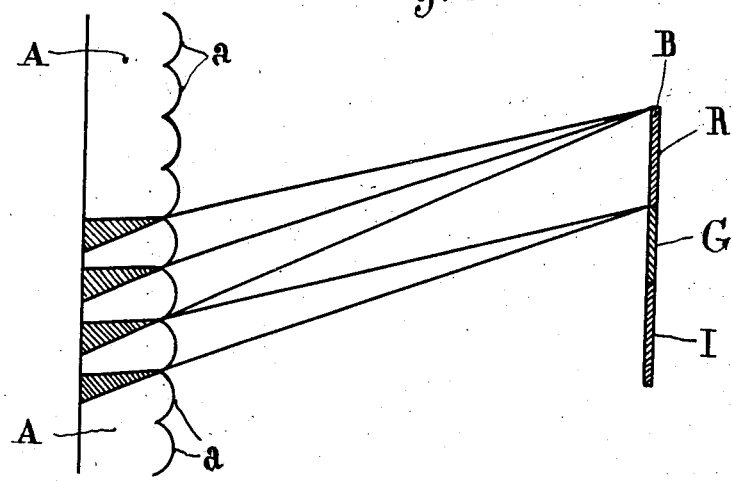
Figure 2:
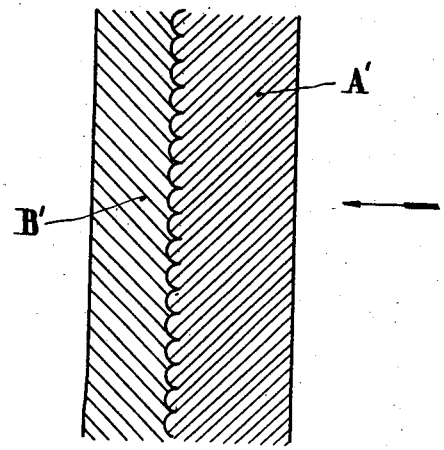

In the accompanying drawing, Figure 1 is a diagram showing one way in which the invention can be carried out, and Fig. 2 is an enlarged sectional view of a fragment of a modified form of film.

Referring to Fig. 1, A indicates the film proper, the refracting elements $a$—$a$ . . . of which face towards filter B which is designed to analyze the colors of the radiations passing through the camera. Filter B will comprise, for instance, three zones: R (red), G (green) and I (indigo violet), and it will be assumed that the film A is composed of dry bichromated gelatine. On exposure to light, radiations from, say, the red zone will be refracted on each of the elements $a$—$a$ and then will pass through the layer, while converging more and more. Said radiations, in passing through the layer, render impervious all the parts touched by light so that such parts will no longer be capable of absorbing a coloring material in the subsequent treatment. Impermeability of the layer will begin from the refracting elements $a$—$a$ . . . and will spread through the layer while following exactly the zone of convergent rays. If, now, the film is dipped into, say, a black coloring agent which is only slightly diffusable, said coloring agent will not penetrate at all through the face that carries the elements $a$—$a$. Per contra, it will penetrate through all the parts not affected by the convergent rays which passed through the elements $a$—$a$ (such parts being shown as cross-hatched). In this manner there will be obtained a positive of the red radiations which on projection, will direct the light rays onto the red filter of the camera as do the hitherto proposed reticulated films with emulsion coatings. If, instead of red radiations, another color had been dealt with, the same reasoning would apply.

An analogous result can be obtained by substituting, for the bichromated gelatine, colophony impregnated with a mixture of phenols and of azo and diazo-compounds destructible by light, the non-destroyed parts developing a black image under the influence either of an alkaline bath or of ammoniacal vapours.

Such films (or plates) are naturally suitable for use with printing apparatus or devices designed for goffered film reproduction, and it is well known that in those devices trichrome filters are generally done away with, since the originals transmit under different angles the radiations corresponding to the colors registered during picture taking.

The same characteristic is equally applicable to the production of films wherein the refracting elements are included between two layers of substances having different refraction indexes.

Figure 2 illustrates the colloid-gelatine example. A' is a celluloid backing carrying, goffered in relief, a multitude of fine refracting elements; B' is a layer of bichromated gelatine. The film is exposed with the celluloid turned towards the source of light; the converging rays pass through the gelatine layer in a manner identical with the one represented by Figure 1 and development of the positive is effected according to the same conditions.

I claim as my invention:

1. A film for color photography, reticulated on one face and consisting of a single layer of material the body or mass of which is impregnated with a sensitizing agent.

2. A film for color photography, reticulated on one face and consisting of a single layer of material the body or mass of which is impregnated with a sensitizing mixture of phenols and diazo compounds destructible by light.

In testimony whereof I affix my signature.

RODOLPHE BERTHON.